United States Patent
Middaugh et al.

(10) Patent No.: US 7,261,158 B2
(45) Date of Patent: Aug. 28, 2007

(54) COARSE-FOAMED FRACTURING FLUIDS AND ASSOCIATED METHODS

(75) Inventors: Richard L. Middaugh, Plano, TX (US); Phillip C. Harris, Duncan, OK (US); Stanley J. Heath, Duncan, OK (US); Robert S. Taylor, Calgary (CA); Ottmar F. Hoch, Calgary (CA); Max L. Phillippi, Duncan, OK (US); Billy F. Slabaugh, Duncan, OK (US); John M. Terracina, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/506,703

(22) Filed: Aug. 18, 2006

(65) Prior Publication Data

US 2007/0044965 A1    Mar. 1, 2007

Related U.S. Application Data

(63) Continuation of application No. 11/089,628, filed on Mar. 25, 2005, now abandoned.

(51) Int. Cl.
*E21B 43/267* (2006.01)

(52) U.S. Cl. ............... 166/280.2; 166/300; 166/308.5; 166/308.6; 166/309; 507/202; 507/213; 507/214; 507/217; 507/225; 507/230; 507/237; 507/238

(58) Field of Classification Search ............. 166/280.1, 166/280.2, 300, 308.5, 308.6, 309; 507/202, 507/213, 214, 217, 225, 230, 237, 238
See application file for complete search history.

(56) References Cited

U.S. PATENT DOCUMENTS

| | | | |
|---|---|---|---|
| 3,980,136 A | * | 9/1976 | Plummer et al. ........ 166/280.1 |
| 4,460,045 A | * | 7/1984 | Elson et al. ................ 166/278 |
| 4,480,696 A | | 11/1984 | Almond et al. |
| 4,519,455 A | | 5/1985 | Holtmyer et al. |
| 4,554,082 A | | 11/1985 | Holtmyer et al. |
| 4,584,002 A | * | 4/1986 | Cox et al. ..................... 96/362 |
| 4,627,495 A | | 12/1986 | Harris et al. |
| 4,780,243 A | | 10/1988 | Edgley et al. .............. 252/307 |

(Continued)

OTHER PUBLICATIONS

Harris, et al., "High-Quality Foam Fracturing Fluids," Society of Petroleum Engineers, SPE 35600.

(Continued)

*Primary Examiner*—George Suchfield
(74) *Attorney, Agent, or Firm*—Robert A. Kent; Baker Botts

(57) ABSTRACT

A method of fracturing a subterranean formation comprising the steps of: providing a coarse-foamed fracturing fluid comprising a liquid fracturing fluid component, a gas, proppant particulates, and a foaming agent; and placing the coarse-foamed fracturing fluid into a portion of a subterranean formation at a pressure sufficient to create or extend at least one fracture therein.

14 Claims, 2 Drawing Sheets

Non-homogeneous Foam

Fine Texture Foam     Coarse Texture Foam     Fine Texture Foam
95% Quality           99% Quality             95% Quality

U.S. PATENT DOCUMENTS

| | | | |
|---|---|---|---|
| 4,830,794 A | 5/1989 | Edgley et al. | 261/62 |
| 4,846,277 A * | 7/1989 | Khalil et al. | 166/280.1 |
| 5,095,987 A | 3/1992 | Weaver et al. | 166/276 |
| 5,711,376 A * | 1/1998 | Sydansk | 166/308.6 |
| 5,799,734 A | 9/1998 | Norman et al. | 166/278 |
| 6,488,091 B1 | 12/2002 | Weaver et al. | 166/300 |
| 6,511,944 B2 | 1/2003 | Taylor et al. | 507/237 |
| 6,544,934 B2 | 4/2003 | Taylor et al. | 507/238 |
| 6,629,451 B1 | 10/2003 | Taylor | 73/54.28 |
| 2005/0189111 A1 | 9/2005 | Taylor et al. | 166/278 |
| 2005/0189112 A1 | 9/2005 | Taylor et al. | 166/278 |

OTHER PUBLICATIONS

Sani, et al., "Experimental Investigation of Xanthan Foam Rheology," Society of Petroleum Engineers, SPE 67263.

* cited by examiner

COARSE-FOAMED FRACTURING FLUIDS AND ASSOCIATED METHODS

CROSS-REFERENCE TO RELATED APPLICATIONS

This application is a continuation of application Ser. No. 11/089,628, entitled "Coarse-Foamed Fracturing Fluids and Associated Methods", filed on Mar. 25, 2005 now abandoned, which is hereby incorporated in its entirety by reference.

BACKGROUND

The present invention relates to coarse-foamed fracturing fluids and methods of using such fluids in subterranean fracturing operations.

The term "coarse foamed" as used herein refers to the texture of the foam. A coarse foamed fluid has a relatively nonuniform bubble size distribution (e.g., a combination of large and small gas bubbles) whereas a fine texture foam has relatively uniform bubble size distribution and most of the bubbles are relatively small. (See FIG. 1 illustrating a coarse foam and a fine textured foam at nonlimiting examples of certain quality levels.) The term "quality" as used herein refers to a foam quality level above which a pure fine textured foam exists, which will depend, inter alia, on the particular fluid composition and the foaming agent used. On a schematic plot of viscosity versus quality in a foamed fluid, the foam transition point is the point at which the foamed fluid becomes a more coarse textured foamed fluid. The transition point is a level of maximum viscosity, which may be relatively well-defined in some instances. The foam transition point for a particular foam may vary as a result of, inter alia, the foam composition (e.g., whether it is an aqueous-based foamed fluid or an oil-based foamed fluid). The particular quality level of the foam at the transition point will similarly vary. The coarse-foamed fracturing fluids of the present invention are foamed fluids that have a quality level at or above the foam transition point for the particular fluid.

Hydraulic fracturing is a process commonly used to increase the flow of desirable fluids from a portion of a subterranean formation. Traditional hydraulic fracturing operations usually comprise the steps of placing a viscous fracturing fluid (often an aqueous gelled fluid) into a portion of a subterranean formation at a rate and pressure such that fractures are created or enhanced in a portion of the subterranean formation. The fractures propagate, e.g., as vertical and/or horizontal cracks radially outward from the well bore. In such treatments, once the hydraulic pressure is released, usually the fractures will not remain fully open. Often, particulate materials, known as proppant, are suspended in the fracturing fluid during at least a portion of the fracturing operation. The particulates are carried into the fractures and deposited therein such that when the hydraulic pressure is released the particulates help prevent the fracture from fully closing, and thus, aid in forming conductive channels through which produced fluids may flow into the well bore. Without the particulate material, the fractures tend to close, thus potentially negating any permeability gained by the fracturing operation. Suitable particulate materials must have sufficient compressive strength to resist crushing, but also should be sufficiently non-abrasive and non-angular to preclude cutting and imbedding into the formation.

Conventional fracturing operations are not universally acceptable treatments for all subterranean formations. One factor that may limit the universal application of a conventional fracturing operation is that they tend to leave behind a residue on the surfaces within the formation and the created fractures. This residue may act as a barrier to desirable fluids that could otherwise travel to the well bore and be produced. One source of such residue is the gelling agent used in the fracturing fluid to create the viscosity necessary to suspend particulates in the fracturing fluid.

One method that has been employed to reduce the load of gelling agent in a fracturing fluid without affecting its ability to suspend proppant particulates has been to foam the fracturing fluid. For example, a gaseous internal phase may be mixed into a liquid fracturing fluid so that the liquid becomes an external phase to the gaseous internal phase. However, as the percentage of gas in the foam increases beyond a specific high quality limit, the ability of the foamed fracturing fluid to carry particulates is thought to decrease. Moreover, it may be difficult to maintain a competent foam with known foaming agents as the percentage of gas in the foam increases. While traditional foamed fracturing operations have a quality of between 50% and 75%, foams having qualities of 70% to 90% have been used in water sensitive formations. Moreover, it has long been believed that in order to successfully carry proppant particulates, a foamed fluid must have a fine, uniform texture rather than a coarse texture.

Another factor that may limit the universal application of a traditional fracturing fluid operation is that some formations are sensitive to the introduction of liquids commonly present in fracturing fluids (be it an aqueous liquid or an oil-based liquid). Thus, alternative operations have been developed wherein a fracturing fluid used is made up entirely of a gas, such as nitrogen or carbon dioxide. Even pure nitrogen treatments have been performed. Such operations eliminate the undesirable liquids, and may be particularly suited for use in shale and coal seam formations. Unfortunately, such 100% gas treatments are not suitable for delivering proppant particulates as part of the treatment.

While these alternative fracturing operations may show a benefit in increased production from a treated well bore, the benefits usually diminish as the fractured formation recovers and the fractures close. Generally, the benefit from such a job can be expected to last no more than 9 months. In order to get a more lasting benefit, it is necessary to have at least a portion of the fracturing fluid comprise a liquid so that the fluid may carry proppant particulates to the fractures. Thus, there is a tension between receiving more lasting benefit by including proppant and reducing the liquid load in the fracturing fluid when conducting fracturing operations in formations that are sensitive to the liquid components in a fracturing fluid.

SUMMARY OF THE INVENTION

The present invention relates to coarse-foamed fracturing fluids and methods of using such fluids in subterranean fracturing operations.

In one embodiment, the present invention provides a method of fracturing a subterranean formation comprising the steps of: providing a coarse-foamed fracturing fluid comprising a liquid fracturing fluid component, a gas, proppant particulates, and a foaming agent; and placing the coarse-foamed fracturing fluid into a portion of a subterranean formation at a pressure sufficient to create or extend at least one fracture therein.

In another embodiment, the present invention provides a coarse-foamed fracturing fluid comprising a liquid fracturing fluid component, a gas, proppant particulates, and a foaming agent, the coarse-foamed fracturing fluid having a quality level at or above the foam transition point for the fluid.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
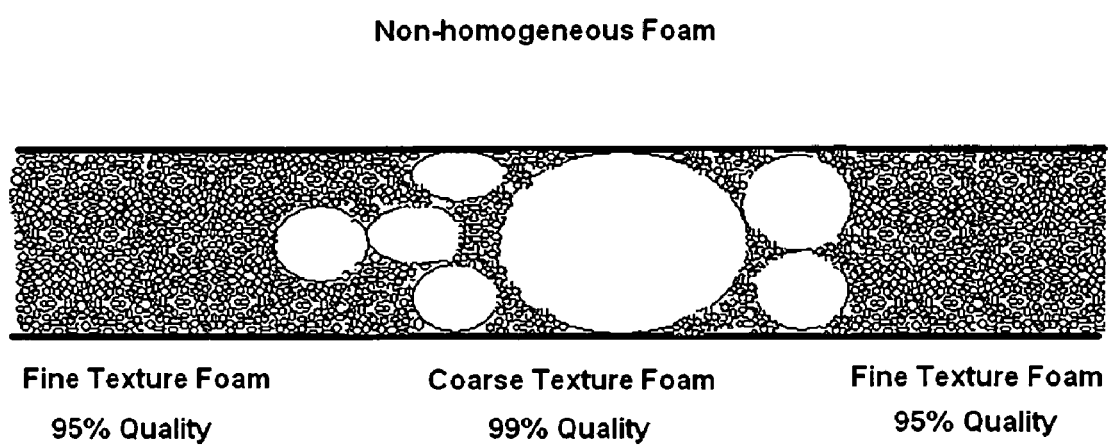
FIG. 1 is a schematic illustration of a foamed fluid having a coarse textured foam and a fine texture at certain exemplary quality levels.

The present invention relates to coarse-foamed fracturing fluids and methods of using such fluids in subterranean fracturing operations.

The coarse-foamed fracturing fluids of the present invention comprise a liquid fracturing fluid component, a gas, proppant particulates, and a foaming agent. By using the methods of the present invention, it is possible to successfully carry particulates in a coarse foam. The coarse-foamed fracturing fluids of the present invention are foamed fluids that have a quality level at or above the foam transition point (or higher quality) for the particular fluid. In some embodiments, these coarse-foamed fracturing fluids (particularly the aqueous embodiments) have a relatively high quality level (e.g., about 85% or above). The specific quality level will depend on, inter alia, the particular fluid composition and the foaming agent used.

The liquid fracturing fluid component of the foamed fracturing fluids of this invention may comprise any fracturing fluid known in the art. In some embodiments of the present invention, the liquid fracturing fluid may be an aqueous gel comprising water and a gelling agent and, optionally, a crosslinking agent for crosslinking the gel to increase the viscosity of the fluid. The water used to form the treatment fluid may be fresh water, salt water, brine, sea water, or any other aqueous liquids (including alcohols) that do not adversely react with the other components. In some embodiments, the liquid fracturing fluid may comprise an oil-based fluid rather than an aqueous-based fluid.

In the aqueous-based fluid embodiments, a variety of gelling agents may be used, including hydratable polymers that contain one or more functional groups such as hydroxyl, carboxyl, sulfate, sulfonate, amino, or amide groups. Suitable gelling agents typically comprise natural polymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucose, xylose, arabinose, fructose, glucuronic acid, or pyranosyl sulfate. Examples of suitable polymers include, but are not limited to, xanthan, guar, guar derivatives (such as hydroxypropyl guar, carboxymethyl guar, and carboxymethylhydroxypropyl guar), and cellulose derivatives (such as hydroxyethyl cellulose and carboxylmethyl hydroxy ethyl cellulose). Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the viscosified treatment fluids of the present invention in an amount in the range of from about 0.01% to about 5% by weight of the water therein. In certain exemplary embodiments, the gelling agents are present in the viscosified treatment fluids of the present invention in an amount in the range of from about 0.01% to about 2% by weight of the water therein.

In some embodiments of the present invention, the liquid fracturing fluid may be an oil-based fluid rather than an aqueous fluid. Any oil-based fracturing fluid known in the art that is compatible with a gaseous foaming agent may be used in the methods of the present invention. Some commonly known oil-based fracturing fluids included hydrocarbon liquids gelled with gelling agents that comprise a metal salt of a phosphoric acid ester. Other known oil-based gelling agents include metal salts of phosphonic acid esters such as those described in U.S. Pat. No. 6,511,944 as issued on Jan. 28, 2003. Other suitable oil-based fracturing fluids are relatively volatile but satisfy safety concerns. One such suitable fluid is described in U.S. patent application Ser. No. 10/788,147 that was filed Feb. 26, 2004, the relevant disclosure of which is hereby incorporated by reference. Another oil-based fracturing fluid that may be suitable for use in the methods of the present invention comprises a gelled mixture of LPG and a hydrocarbon fluid. Some such fluids are described in U.S. patent application Ser. No. 10/788,152 that was filed Feb. 26, 2004, the relevant disclosure of which is hereby incorporated by reference. One should note that when an oil-based fracturing fluid is used, the quality of the foam may be significantly lower, e.g., the point at which the foamed fracturing fluid becomes a coarse textured foam rather than a fine textured foam will likely be at a lower quality level than an aqueous-based foam. In some instances, this quality level may be around about 70-75% quality. The particular transition point of a particular oil-based foamed fluid of this invention may be affected by, inter alia, the foaming agent used.

Whether the chosen liquid fracturing fluid component of the foamed fracturing fluids of this invention is aqueous or oil-based, it may further include additives, such as internal delayed gel breakers (such as enzyme, oxidizing, acid buffer, or temperature-activated gel breakers). Gel breakers are used to reduce the viscosity of a gelled fluid once a fracturing operation is substantially complete. The gel breaker used is typically present in a fracturing fluid in an amount in the range of from about 0.05% to about 10% by volume of the fracturing fluid. The treatment fluids may also include one or more of a variety of well-known additives, such as gel stabilizers, fluid loss control additives, clay stabilizers, bactericides, surfactants, and the like.

Particulates suitable for use in the present invention may comprise any particulate material suitable for use in subterranean fracturing operations. Suitable particulate materials include, but are not limited to: sand; bauxite; ceramic materials; glass materials; polymer materials; TEFLON® (polytetrafluoroethylene) materials; plastics; nylon; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and derivatives or combinations thereof Composite particulates may also be suitable. Suitable composite materials may comprise a binder and a filler material wherein suitable filler materials may include silica, alumina, fumed carbon, carbon black, graphite, mica, titanium dioxide, meta-silicate, calcium silicate, kaolin, talc, zirconia, boron, fly ash, hollow glass microspheres, solid glass, and derivatives or combinations thereof. Typically, suitable particulates have a size in the range of from about 2 to about 400 mesh, U.S. Sieve Series. In particular embodiments, preferred particulates size distribution ranges are one or more of 6/12 mesh, 8/16, 12/20, 16/30, 20/40, 30/50, 40/60, 40/70, or 50/70 mesh. It should be understood that the term "particulate," as used in this disclosure, includes all known shapes of materials including substantially spherical materials, fibrous materials, polygonal materials (such as cubic materials), and derivatives or mixtures thereof.

In some embodiments of the present invention, a dense slurry of liquid fracturing fluid and particulates may be used to help reduce the level of liquid in a final foamed fracturing fluid as low as possible. U.S. Pat. No. 5,799,734, the relevant disclosure of which is hereby incorporated by reference, describes such dense slurries in more detail. In some preferred embodiments utilizing such a dense slurry, an aqueous fracturing fluid is used along with a xanthan gelling agent. Xanthan gelling agents have been found to provide excellent static support for particulates when used to create a foamed fluid. Metallic crosslinked systems may also be used though they are less compatible with xanthan gelling agents in particular and may prove to be damaging to the portion of the subterranean formation being treated.

A variety of gases are suitable for use as the internal phase of the foamed fracturing fluids of the present invention including, but not limited it, carbon dioxide, nitrogen, air, methane, and propane and mixtures thereof. The choice of a suitable gas may be related, at least in part, to the liquid fracturing fluid being used and any relevant safety concerns involved in a particular application. For example, where the liquid phase is oil-based, a hydrocarbon gas such as methane may be preferred. Carbon dioxide foams may be better suited than nitrogen foams for deeper wells as they tend to have greater density than nitrogen gas foamed fluids and so the surface pumping pressure required to reach a corresponding depth is lower with carbon dioxide than with nitrogen. In some embodiments of the present invention the chosen gas may comprise some combination of at least two of: air, carbon dioxide, and nitrogen. Some factors considered when selecting a gas include operator preference, safety, economics, depth, or availability.

When combining a liquid and a gas to form a coarse-foamed fracturing fluid of the present invention, a foaming agent is generally used, inter alia, to facilitate the formation of a competent foam and to aid in maintaining the foam. For the aqueous-based embodiments of the coarse-foamed fracturing fluids of the present invention, suitable foaming agents may include cationic, anionic, nonionic or amphoteric surfactants, such as for example, betaines, sulfated or sulfonated alkoxylates, alkyl quaternary amines, alkyl aryl ethoxylates, alkyl amine ethoxylates, alkyl amine oxides, alkoxylated linear alcohols, alkyl sulfonates, alkyl aryl sulfonates, alkyldiphenyl ether sulfonates and the like. For the nonaqueous-based embodiments of the coarse-foamed fracturing fluids of the present invention, suitable foaming agents include fluorosurfactants, and, more preferably, suitable cationic, anionic, nonionic, or amphoteric fluorosurfactants. The particular foaming agent employed will depend upon the type of formation which is to be fractured, the liquid fracturing fluid chosen, and the percentage of gas in the final coarse-foamed fracturing fluid. The foaming agent, preferably, is mixed with the liquid fracturing fluid before the gas is added to facilitate uniform mixing and to assist in stabilizing the two phase structure of the foam. SPE Paper No. 35600, the relevant disclosure of which is herein incorporated by reference, considered the effect of various available foaming agents and determined that, for high quality nitrogen foams, certain anionic surfactants may be preferred. For example, in separate test runs using (1) alpha olefin sulfonate (an anionic surfactant), (2) alkoxylate sulfate (an anionic surfactant), and (3) betaine (an amphoteric surfactant) was found to be able to produce a 90% quality polymer foam (foaming a base liquid comprised of water and about 0.24% guar polymer), when the quality was raised to 90% anionic surfactant #1 performed significantly better in creating a competent foam.

The presence of a foaming agent helps the liquid component of a coarse-foamed fracturing fluid to maintain structural stability and produce a competent foam having relatively small gas bubbles. When foamed fluid exceeds its transition point and begins to produce large gas bubbles, the viscosity of the foam tends to drop off and the texture becomes more coarse. In certain embodiments of the coarse-foamed fracturing fluids of the present invention, it is believed that regions of fine-textured foam exist along with regions of coarse textured foam; such foams are able to support proppant in the fine textured regions even at very high foam quality levels. (See FIG. 1, which illustrates the fine textured areas in combination with the coarse textured areas.) In such embodiments, the concentration of the foaming agent should be high enough in the volume of liquid to create at least regions of fine-textured foam and to provide viscosity stability at high shear rate. That is, maximum structural stability and finest texture is generally achieved with high enough surfactant concentration to fully coat the maximum possible number of created bubbles within the foam. For example, nitrogen foams in the 65%-80% quality range generally incorporate from about 0.2-0.5% by volume foaming agent. By contrast, to create a fine-textured water foam having a 95% quality, about 1 to about 2% by volume of foaming agent is desired. For stabilizing the coarse-textured foamed fracturing fluids of this invention, about 0.1% to about 10% by volume of the foaming agent may be desired. The amount required depends upon the particular foaming agent, since some are better than others at stabilizing certain foamed fluids, as shown, for example, in reference SPE 35600.

The methods of the present invention have been found to be capable of creating of a coarse-foamed fracturing fluid from a dense xanthan gelled liquid fracturing fluid that are as dense as about 60 lb/Mgal, even though the prior art taught that such foams were limited to xanthan gelled liquid fracturing fluids only as dense as about 40 lb/Mgal. This ability to foam a denser xanthan gelled liquid fracturing fluid relates directly to the level of proppant the resultant foam may be able to transport in a fracturing application. For example, a 60 lb/Mgal xanthan gelled liquid fracturing fluid can be used to suspend proppant concentrations of about 30 lb/Mgal. The actual amount may be limited practically by the ability to pump the fluid, rather than the fluid itself.

Some embodiments of the present invention provide methods of fracturing a subterranean formation comprising placing a coarse-foamed fracturing fluid of the present invention into a subterranean formation at a pressure sufficient to create or extend at least one fracture therein wherein the coarse-foamed fracturing fluid comprises a liquid fracturing fluid, a gas, particulates, and a foaming agent.

To facilitate a better understanding of the present invention, the following examples of certain aspects of some embodiments are given. In no way should the following examples be read to limit, or define, the scope of the invention.

EXAMPLES

Figure 2:
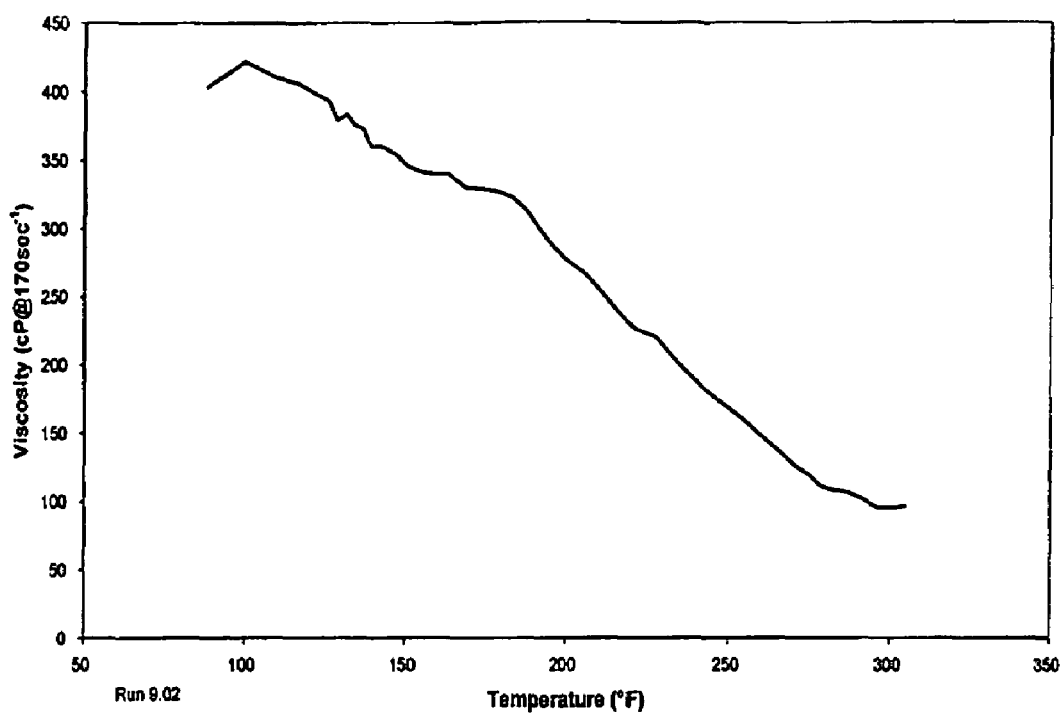
FIG. 2 illustrates some data regarding the change in viscosity as temperature increased of a 80% foam made from 60 lb/Mgal xanthan gelled liquid fracturing fluid.

A 60 lb/Mgal xanthan gelled liquid fracturing fluid was combined with 20 gal/Mgal of an alpha olefin sulfonate foaming agent and 2.7% $KNO_3$ and put into a 685 mL flow loop pressurized to 1000 psi and nitrogen was added up to 80% quality while circulating at 100 $sec^{-1}$. Liquid effluent from the backpressure regulator was weighed on a balance and quality was determined from the ratio of the effluent mass to the mass of the original liquid volume in the 685 mL loop. Once a stable, fine-textured foam was equilibrated in the flow loop, the shear rate was reduced to 170 $sec^{-1}$. Heat was applied to increase the temperature at 8° F./minute while viscosity was monitored. The results showing the change in viscosity as temperature increased of the 80% foam made from 60 lb/Mgal xanthan gelled liquid fracturing fluid is shown in FIG. 2.

Figure 3:
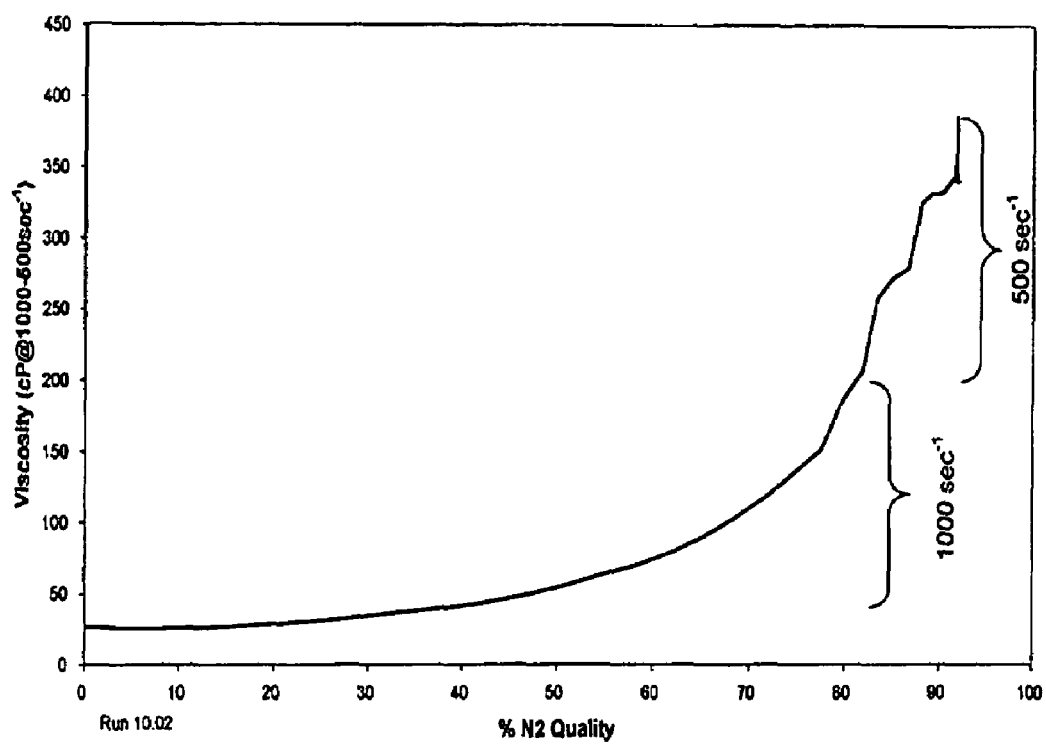
FIG. 3 illustrates some data from an embodiment of the present invention.

Next, a 60 lb/Mgal xanthan gelled liquid fracturing fluid was combined with 2% alpha olefin sulfonate foaming agent and 2.7% $KNO_3$ at a pH of 10.8 and placed in a 685 mL flow loop pressurized to 1000 psi and nitrogen was added up to in excess of 80% quality while circulating at 1000 $sec^{-1}$. At a quality of about 80% the pump producing the shear was operating at about it's maximum stress level and the shear rate was dropped to 500 $sec^{-1}$ while the quality was continually increased up to about 92%. The resultant foam still showed good quality without significant degradation. The results can be seen in FIG. 3.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method of fracturing a subterranean formation comprising:
   providing a coarse-foamed fracturing fluid comprising a liquid fracturing fluid component, a gas, proppant particulates, and a foaming agent, wherein the coarse-foamed fracturing fluid has a quality level at or above the foam transition point for the fluid; and
   placing the coarse-foamed fracturing fluid into a portion of a subterranean formation at a pressure sufficient to create or extend at least one fracture therein.

2. The method of claim 1 wherein the foam has a quality of at least about 85%.

3. The method of claim 1 wherein the liquid fracturing fluid component comprises an aqueous fracturing fluid that comprises an aqueous fluid and at least one gelling agent.

4. The method of claim 3 wherein the gelling agent comprises a component selected from the group consisting of: a hydroxyl group; a carboxyl group; a sulfate group; a sulfonate group; an amino group; an amide group; a natural polymer; a synthetic polymer; a polysaccharide; xanthan; guar; a guar derivatives; a cellulose derivative; polyacrylate; polymethacrylate; polyacrylamide; polyvinyl alcohol; polyvinylpyrrolidone; and a depolymerized gelling agent.

5. The method of claim 3 wherein the gelling agent is present in an amount of about 0.01% to about 5% by weight of the aqueous fluid.

6. The method of claim 3 wherein the aqueous fracturing fluid comprises a crosslinking agent.

7. The method of claim 1 wherein the liquid fracturing fluid component comprises an oil-based fluid.

8. The method of claim 7 wherein the liquid fracturing fluid also comprises a gelling agent that comprises a component selected from the group consisting of: a metal salt of a phosphoric acid ester; and a metal salt of phosphonic acid ester.

9. The method of claim 1 wherein the coarse-foamed fracturing fluid further comprises at least one component selected from the group consisting of: an internal delayed gel breaker, a gel stabilizer, a fluid loss control additive, a clay stabilizer, a bactericide, and a surfactant.

10. The method of claim 1 wherein the proppant particulates comprise a material selected from the group consisting of: sand; bauxite; a ceramic material; a glass material; a polymer material; a polytetrafluoroethylene material; a plastic; nylon; a nut shell piece; a seed shell piece; a cured resinous particulate that comprises a nut shell piece; a cured resinous particulate that comprises a seed shell piece; a fruit pit piece; a cured resinous particulate that comprises a fruit pit piece; and wood.

11. The method of claim 1 wherein the gas is selected from the group consisting of: carbon dioxide, nitrogen, air, methane, propane, and a mixture thereof.

12. The method of claim 1 wherein the foaming agent comprises a surfactant.

13. The method of claim 12 wherein the surfactant is selected from the group consisting of: an alpha olefin sulfonate; a betaine; alkoxylate; alkyl quaternary amine; alkyl aryl ethoxylate; alkyl amine ethoxylate; alkyl amine oxide; alkoxylated linear alcohol; alkyl sulfonate; fluorosurfactant; alkyl aryl sulfonate; and alkyldiphenyl ether sulfonates.

14. The method of claim 1 wherein the foaming agent is present in the coarse-foamed fracturing fluid in an amount of about 0.1% to about 10% of the liquid fracturing fluid component.

* * * * *